(12) United States Patent
Persent et al.

(10) Patent No.: US 9,784,044 B2
(45) Date of Patent: Oct. 10, 2017

(54) CONNECTOR FOR RISERS EQUIPPED WITH AN EXTERNAL LOCKING COLLAR

(71) Applicant: IFP ENERGIES NOUVELLES, Rueil-Malmaison (FR)

(72) Inventors: Emmanuel Persent, Croissy sur Seine (FR); Navid Saeedi, Alfortville (FR); Gerard Papon, Les Essarts le Roi (FR)

(73) Assignee: IFP ENERGIES NOUVELLES, Rueil-Malmaison (FR)

( * ) Notice: Subject to any disclaimer, the term of this patent is extended or adjusted under 35 U.S.C. 154(b) by 0 days.

(21) Appl. No.: 14/756,166

(22) Filed: Aug. 11, 2015

(65) Prior Publication Data

US 2016/0060971 A1    Mar. 3, 2016

(30) Foreign Application Priority Data

Aug. 11, 2014    (FR) ...................................... 14 57737

(51) Int. Cl.
*E21B 7/12* (2006.01)
*E21B 17/01* (2006.01)
*E21B 17/08* (2006.01)
*F16L 21/08* (2006.01)

(52) U.S. Cl.
CPC ............ *E21B 17/085* (2013.01); *E21B 17/01* (2013.01); *F16L 21/08* (2013.01)

(58) Field of Classification Search
None
See application file for complete search history.

(56) References Cited

U.S. PATENT DOCUMENTS

| | | | | |
|---|---|---|---|---|
| 4,491,346 A | * | 1/1985 | Walker | E21B 33/038 285/18 |
| 5,441,311 A | * | 8/1995 | Watkins | F16L 37/002 285/18 |
| 5,992,893 A | * | 11/1999 | Watkins | E21B 17/07 166/89.2 |
| 8,474,540 B2 | * | 7/2013 | Guesnon | E21B 17/085 166/339 |
| 8,733,452 B2 | * | 5/2014 | Guesnon | E21B 17/085 166/341 |

FOREIGN PATENT DOCUMENTS

| | | |
|---|---|---|
| FR | 2839339 A1 | 11/2003 |
| FR | 2925105 A1 | 6/2009 |
| FR | 2937676 A1 | 4/2010 |
| FR | 2956693 A1 | 8/2011 |
| FR | 2956694 A1 | 8/2011 |
| WO | 2011104629 A1 | 9/2011 |

OTHER PUBLICATIONS

Search Report for French Application No. FR 1457737 dated Apr. 24, 2015.

* cited by examiner

*Primary Examiner* — Matthew R Buck
*Assistant Examiner* — Douglas S Wood
(74) *Attorney, Agent, or Firm* — Fitch, Even, Tabin & Flannery LLP (57) ABSTRACT

The present invention is a connector (5) for a riser equipped with an external locking collar (11). Locking collar (11) cooperates with a male flange (24) of a male connector element (9) and a female flange (23) of a female connector element (8) by means of a series of tenons. The invention also relates to a riser including several sections (4) assembled by a connector (5).

27 Claims, 8 Drawing Sheets

CONNECTOR FOR RISERS EQUIPPED WITH AN EXTERNAL LOCKING COLLAR

CROSS REFERENCE TO RELATED APPLICATION

Reference is made to French Patent Application Serial No. 14/57.737 filed on Apr. 11, 2014, which application is incorporated herein by reference in its entirety.

BACKGROUND OF THE INVENTION

Field of the Invention

The present invention relates to deep sea oil reservoir drilling and development and a connector for assembling two riser sections.

A riser is made up of an assembly of tubular elements ranging in length between 15 and 27 m (50 and 90 feet), assembled by connectors. The tubular elements generally have a main tube provided with a connector at each end thereof. Tubular auxiliary lines, also called peripheral lines, which are commonly referred to as the "kill line", the "choke line", the "booster line" and the "hydraulic line", which allow circulation of technical fluids, are provided parallel to the main tube. The tubular elements are assembled on the drilling site, from a floater. The riser is lowered into the water depth as the tubular elements are assembled, until it reaches the wellhead located on the sea bottom.

In the perspective of drilling at water depths that can reach 3500 m or more, the weight of the riser becomes very much a problem. This phenomenon is increased by the fact that, for the same maximum working pressure, the length of the riser requires a larger inside diameter for the auxiliary lines, wherein consideration of the necessity to limit pressure drops.

Moreover, the necessity to decrease the riser assembly time is more critical since the water depth, and therefore the riser length, is great.

French Patent Nos. 2,925,105, 2,956,693 and 2,956,694 describe various solutions notably involving the auxiliary lines, together with the main tube, in the taking up of the longitudinal stresses applied to the riser. However, for the systems described in these patents, fastening of the auxiliary lines with respect to the main tube leads to high tensile stresses in the auxiliary lines. In order to withstand these tensile stresses, the auxiliary lines have great thickness, which generates an increase in the mass and size of the floats, and therefore in the cost of the riser.

SUMMARY OF THE INVENTION

The present invention provides a compact connector design with a single external or peripheral locking collar. According to the invention, the auxiliary lines are mobile by use of a sliding pivot connection whose relative motion is limited by a clearance adjustment mechanism. The connector according to the invention is well suited for deep-sea risers located at depths greater than 2000 meters. Thus, the thickness of the auxiliary lines can be reduced, which reduces the mass of the floats, the total mass of the riser and the cost thereof.

The invention is a connector for assembling two riser sections, comprising a first main tube element extended by a male connector element provided with a male flange pierced by at least one orifice for passage of a first auxiliary line element, a second main tube element extended by a female connector element provided with a female flange pierced by at least one orifice for passage of a second auxiliary line element, the male connector element fitting into the female connector element to connect the two main tube elements and the two auxiliary line elements. The connector comprises a mechanism for locking the assembly. The locking mechanism has a locking collar assembling the male and female flanges by cooperating with the periphery of the male and female flanges along with one of the auxiliary line elements being secured to one of the male or female flanges while the other auxiliary line element is connected by a sliding pivot connection to the other male or female flange. The sliding pivot connection allows a relative translational motion between the flange and the auxiliary line element over a distance limited by a clearance adjustment mechanism positioned between the auxiliary line element and the flange.

According to the invention, the locking collar comprises a first and a second series of tenons and the inner face thereof and the male and female flanges are respectively a third and a fourth series of tenons on the peripheral surface thereof. The third and fourth series of tenons cooperating with the first and second series of tenons respectively.

Advantageously, each series of tenons comprises at least two rows of at least four tenons.

Preferably the clearance means comprises a mechanism which is a nut or a threaded part.

According to a first variant embodiment of the invention, one auxiliary line element is extended by a female end piece and the other auxiliary line element is extended by a male end piece provided with a nut.

According to a second variant embodiment of the invention, one auxiliary line element is extended by a female end piece and the other auxiliary line element is extended by a receptacle in which a male pin provided with a stop is inserted.

According to a third variant embodiment of the invention, one auxiliary line element is extended by a receptacle in which a female pin is inserted and the other auxiliary line element is extended by a receptacle in which a male threaded pin is inserted. The male threaded pin is a shoulder.

Advantageously, the distance limited by the clearance adjustment ranges between 0 and 38.1 mm and preferably, is between 2.54 and 25.4 mm.

According to one aspect of the invention, the male connector element comprises a sleeve inserted in the female connector element.

According to a feature of the invention, the auxiliary line element is a steel tube around which are wound reinforcement wires such as glass, carbon or aramid fibers, coated with a polymer matrix.

According to an embodiment of the invention, the sliding pivot connection is achieved in the male flange.

Furthermore, the distance of the relative translational motion of the sliding pivot connection can be adjusted to be positive upon connection of the sections and zero when using the riser for offshore drilling operations.

The invention also relates to a riser comprising at least two riser sections assembled by a connector according to the invention.

BRIEF DESCRIPTION OF THE DRAWINGS

Other features and advantages of the method according to the invention will be clear from reading the description hereafter of embodiments given by way of non-limitative example, with reference to the accompanying figures wherein:

FIG. 1 diagrammatically shows a riser according to the invention.

DETAILED DESCRIPTION OF THE INVENTION

Figure 1:
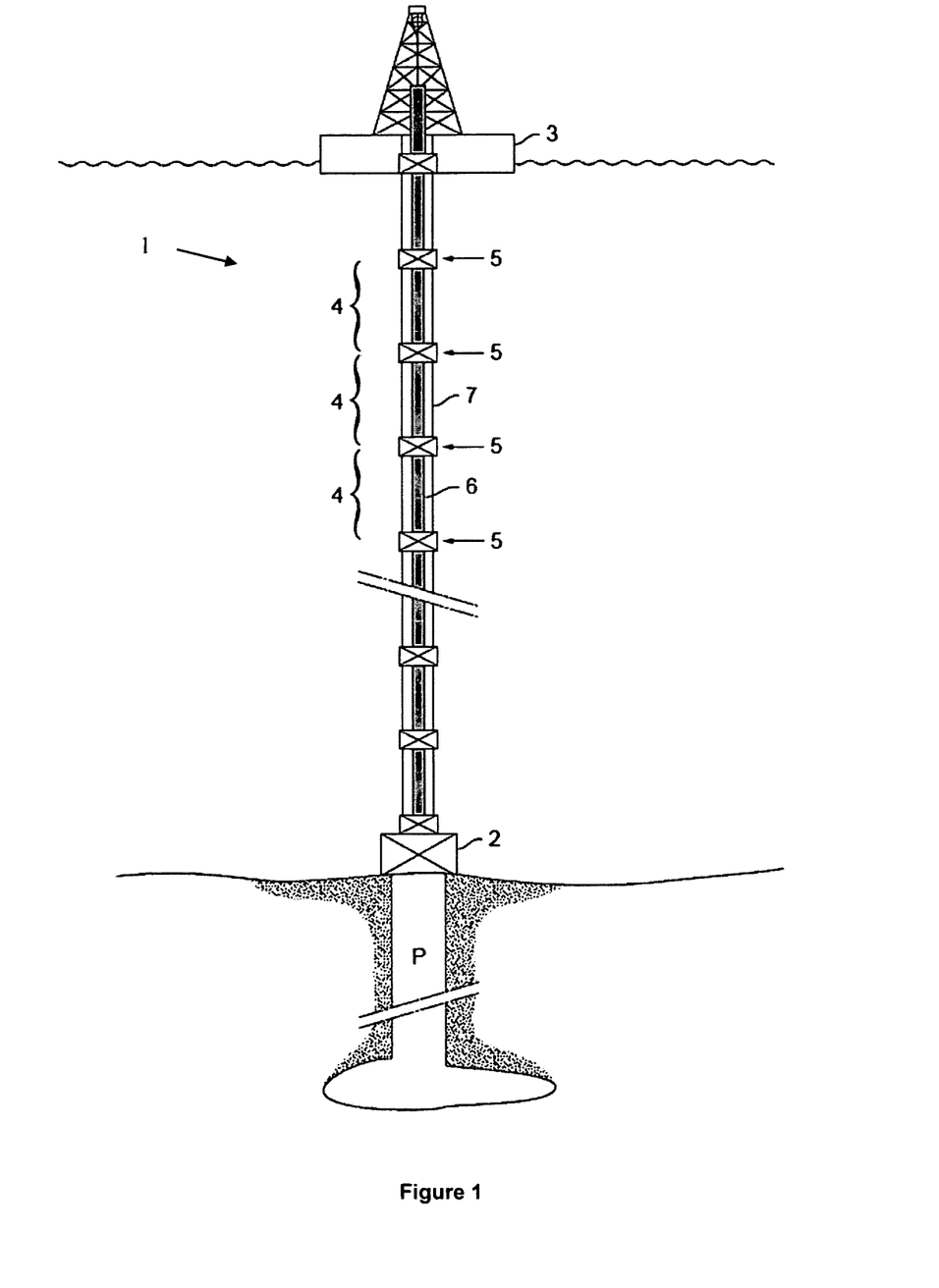

FIG. 1 diagrammatically shows a riser 1 installed offshore. Riser 1 extends well P and it stretches from wellhead 2 to floater 3 which is, for example, a platform or a vessel. Wellhead 2 is provided with preventers commonly referred to as a "B.O.P." or a "Blow-Out Preventer". Riser 1 is an assembly of several sections 4 assembled end to end by connectors 5. Each section comprises a main tube element 6 provided with at least one auxiliary line element 7 which is also referred to as peripheral line. The auxiliary lines, which are referred to as kill lines or choke lines, are used to provide well safety during control procedures relative to the inflow of fluids under pressure in the well. The line referred to as choke line is a safety line carrying fluids (oil, water, gas) coming from the well in the event of an inflow and driving them towards the choke manifold and the flare. The line referred to as kill line is a safety line enabling injection into the well of heavy fluids and cements allowing an otherwise uncontrollable blowout to be stopped. The line referred to as booster line allows mud to be injected into the well in order to increase the annulus velocity thereof and to prevent sedimentation of the cuttings; it is also used for replacing the mud contained in the riser by water prior to disconnection. The line referred to as hydraulic line allows the wellhead preventer to be controlled. Hydraulic lines allow the BOP safety devices (valves and accumulators) to be supplied with hydraulic fluid (glycol-laden distilled water) under pressure.

Figure 2:
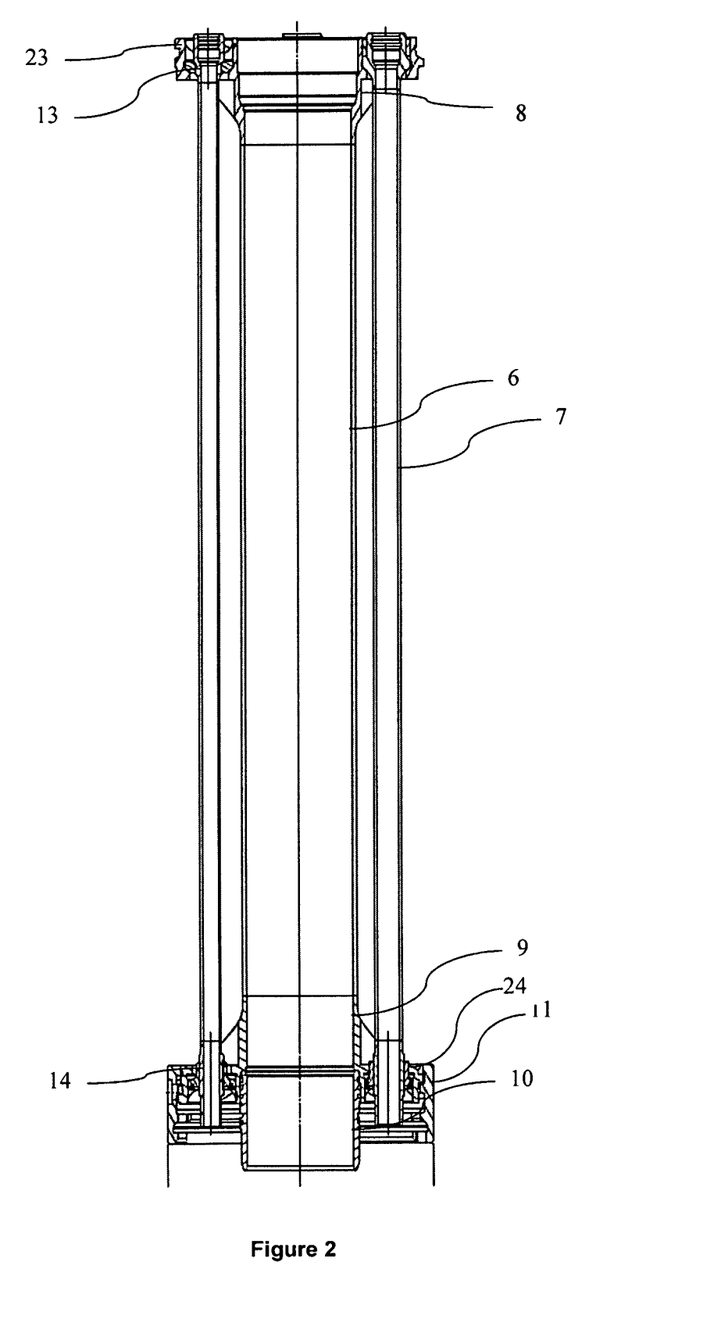
FIG. 2 illustrates a riser section according to the invention.

FIG. 2 diagrammatically shows a section 4 of the riser according to one embodiment of the invention. Section 4 comprises a main tube element 6 whose axis forms the axis of the riser. Auxiliary lines 7 make up auxiliary lines or ducts arranged parallel to the axis of the main tube. The elements of auxiliary line 7 have lengths substantially equal to the length of main tube element 6 which generally ranges between 10 and 30 meters. There is at least one line 7 arranged on the periphery of the main tube. In FIG. 2, two lines 7 are shown.

A connector 5 shown in FIG. 1 notably comprises two elements respectively designated, with reference to FIG. 2, as a female connector element 8 and a male connector element 9. Connector elements 8 and 9 are mounted at the ends of main tube element 6. Female connector element 8 is secured to tube 6, which for example may be by welding, by screwing, by crimping or by clamping linkage. Male connector element 9 is secured to tube 6, for example by welding, by screwing, by crimping or by clamping linkage. The assembly of male connector element 9 with a female connector element 8 of another section forms a connector 5 that transmits stresses from a riser section to the next section, notably the longitudinal stresses undergone by the riser.

Female connector element 8 and male connector element 9 are respectively provided with a female flange 23 and a male flange 24 crossed by at least one orifice for passage of auxiliary line element 7. According to the invention, connector elements 8 and 9 extend main tube element 6 by increasing the thickness and the outer section of the tube, to form flanges 23 and 24 respectively. Preferably, the outer section of connector elements 8 and 9 varies progressively along the axis of main tube 6, for preventing sudden section variations between tube 6 and flanges 23 and 24 that might weaken the mechanical strength of connector 5. For example, with reference to FIG. 2, flanges 23 and 24 form shoulders.

Connector 5 can be designed and dimensioned so as to meet the specifications mentioned by the API 16 R and API 2 RD standards edited by the American Petroleum Institute.

Figure 3:
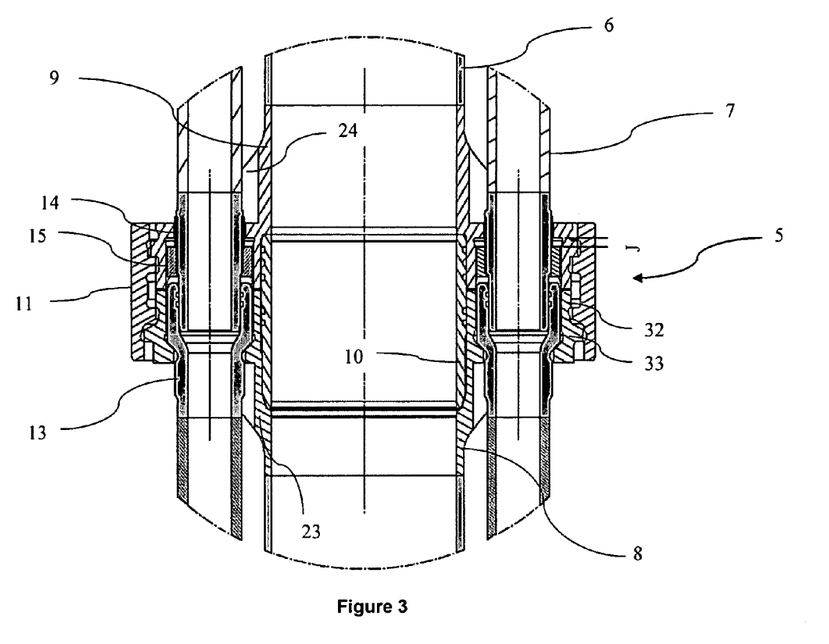
FIG. 3 illustrates a connector for assembling two riser sections according to the invention.

FIG. 3 shows an example of a connector 5 according to the invention wherein a male connector element 9 is fitted in a female connector element 8. A portion of male connector element 9 penetrates inside female connector element 8. This fitting is limited by an axial stop in which the end of male connector element 9 comes to rest against the axial shoulder provided on the inner surface of female connector element 8. The axial shoulder provided on the outer surface of male connector element 9 comes to rest against the axial shoulder provided on the inner surface of female connector element 8. As shown in FIGS. 2 and 3, male connector element 9 can comprise a sleeve 10 fastened in the male connector element. Sleeve 10 provides a centering and sealing function with respect to the male 9 and female 8 connector elements. Fastening of sleeve 10 can be achieved by welding, by threading, by gluing, by wrapping or by any other similar mechanism. Instead of sleeve 10, variant embodiments (not shown) can be considered, such as the continuation of main tube element 6.

Connector 5 comprises a single locking collar 11 that cooperates with the periphery of the female 23 and male 24 flanges, that is, with the outer surface of larger diameter of the flanges. Locking collar 11 is then a peripheral or external collar arranged outside the flanges. The diameter of collar 11 is therefore greater than the diameter of flanges 23 and 24. When male connector element 9 is fitted in a female connector element 8, a part of collar 11 cooperates with the periphery of the female 23 and male 24 flanges, notably by tenons forming bayonet connections. Locking and unlocking of connector 5 is achieved through rotation of collar 11 (bayonet type locking). Collar 11 can be provided with an operating mechanism, for example an operating bar that can be removable. The operating mechanism allows collar 11 to be rotated. The longitudinal stresses, that is the stresses oriented along the axis of the main tube, are transmitted from a section 4 to the adjacent section 4 through the agency of the connections between collar 11 and the female 8 and male 9 connector elements. Notably, the longitudinal stresses are transmitted from the tenons of male flange 24 to the tenons of collar 11 and from the tenons of collar 11 to the tenons of female flange 23.

Figure 4:
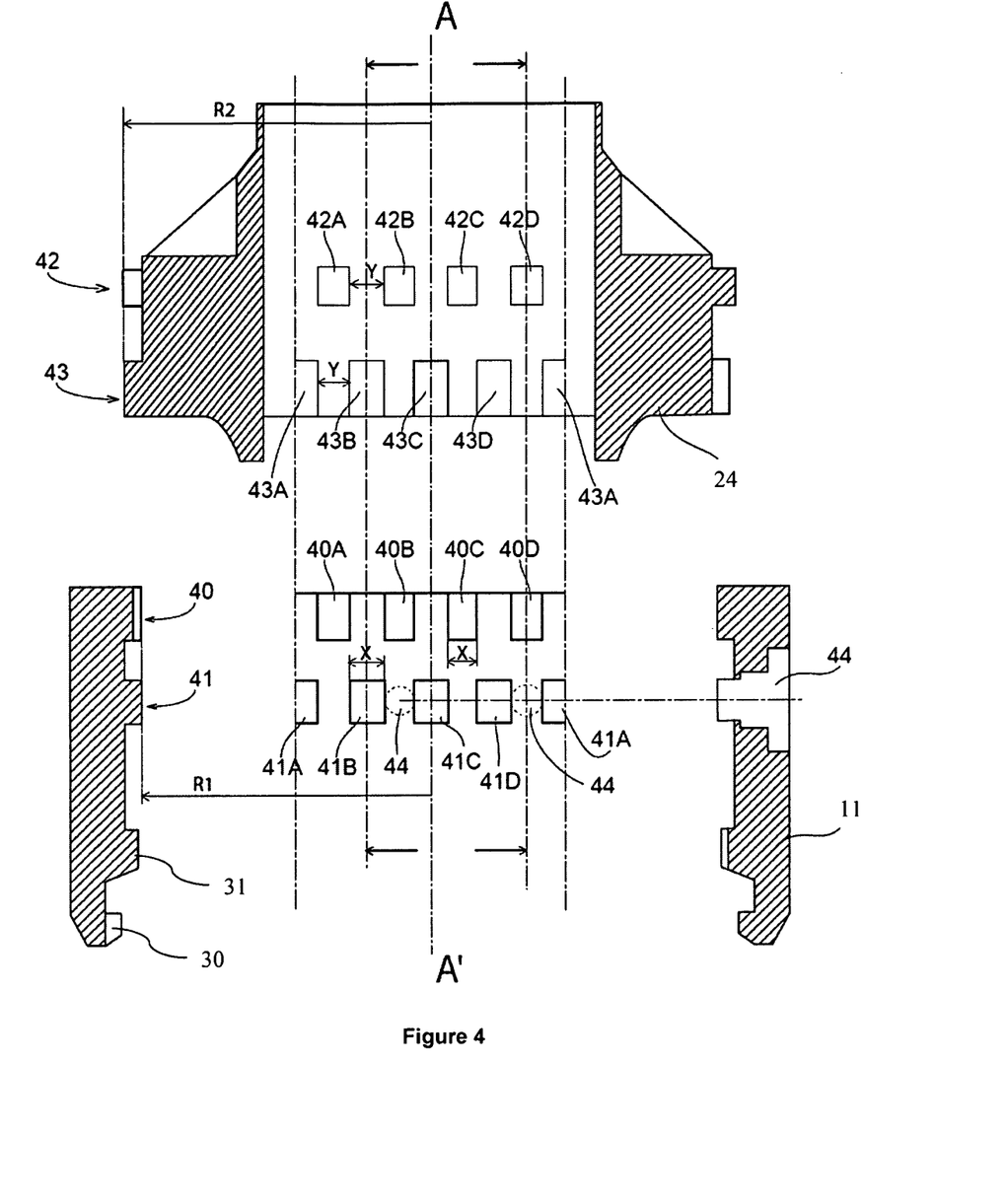
FIG. 4 illustrates an exploded view prior to connection of the locking collar and the male flange.

According to an embodiment example, locking collar 11 is mounted on male flange 24. As illustrated in FIGS. 2, 3 and 4, locking collar 11 comprises on the inner face thereof a first series 40 and 41 of tenons cooperating with a series of tenons 42 and 43 positioned on the outer face of the periphery of male flange 24. Thus, locking collar 11 is fastened to male flange 24 when riser sections are connected.

In an unlocked situation, the collar is secured to the male element by pins (not shown in FIG. 3). Collar 11 comprises on the other side, on the inner face thereof, a second series of tenons 30 and 31 cooperating with a series of tenons 32 and 33 arranged on the outer face of the periphery of female connector element 8.

This embodiment of locking collar 11 with bayonet connections with the two flanges provide a connector that can be entirely dismantled, to facilitate inspection and maintenance thereof. Furthermore, this embodiment of locking collar 11 allows having a collar 11 and male 9 and female 8 connector elements, and their flanges, that are nearly symmetrical, which facilitates their manufacture.

Collar 11 is retained by the series of tenons of the collar and the male 24 and female 23 flanges. Thus, the axial stresses are transmitted from male connector element 9 to female connector element 8 via the tenons without going through sleeve 10.

With reference to FIGS. 3 and 4, male flange 24 and female flange 23 respectively comprise a series of tenons having two crowns (or rows) of tenons or pegs. Collar 11 comprises two series of tenons that can respectively have two crowns (or rows) of tenons or pegs. The tenons preferably extend in radial directions. According to a preferred embodiment, each crown (row) of tenons comprises four tenons. In FIG. 4, male flange 24 comprises a first crown 42 of four tenons 42A, 42B, 42C and 42D and a second crown 43 of four tenons 43A, 43B, 43C and 43D. Collar 11 also comprises a first crown 40 of four tenons 40A, 40B, 40C and 40D and a second crown 41 of four tenons 41A, 41B, 41C and 41D. Tenons 42 and 43 of male flange 24 cooperate with tenons 40 and 41 of locking collar 11. FIG. 4 only shows the connection between male flange 24 and collar 11 which is substantially symmetrical.

For each assembly between collar 11 and a flange, the tenons are angularly offset from one crown to the next and they are inscribed in cylindrical surfaces of equal radius.

First and second crowns 40 and 41 of tenons of collar 11 are cut in a cylinder of radius R1. First and second crowns 42 and 43 of tenons of the male flange are cut in a cylinder of radius R2 greater than radius R1. Alternatively, crowns 40, 41, 42 and 43 of tenons can be cut in cylinders of different radii.

Tenons 40 of the first crown of collar 11 cooperate with tenons 42 of the first crown of male flange 24 to form a bayonet assembly. Tenons 41 of the second crown of collar 11 cooperate with tenons 43 of the second crown of male flange 24.

Moreover, as illustrated in FIG. 4, collar 11 can comprise one or more orifices 44 allowing passage of pins for holding collar 11 on male flange 24. Preferably, locking collar 11 is provided with at least two orifices 44, or at least three orifices 44 in order to limit and to prevent sticking of locking collar 11 on male flange 24. According to a preferred variant, locking collar 11 comprises an orifice 44 for a pin between each tenon of crown 41.

More precisely, when collar 11 is engaged around male flange 24, collar 11 follows a translational motion in the direction of the main tube axis according to the following successive stages:

second crown 41 of collar 11 moves on the outside of first crown 42 of male flange 24, then the tenons of second crown 41 of collar 11 fit between tenons 43 of the second crown of male flange 24 and, simultaneously, the tenons of first crown 40 of collar 11 fit between tenons 42 of the first crown of male flange 24, then when collar 11 reaches the stop, tenons 40 of the first crown of collar 11 lodge themselves in a groove (schematized in FIGS. 3 and 4) provided in male flange 24 between first crown 42 and second crown 43 of the male flange, and tenons 41 of the second crown of collar 11 lodge themselves in a groove (schematized in FIGS. 3 and 4) provided in male flange 24 beneath second crown 43 of male flange 24.

Then, when collar 11 abuts against male flange 24, collar 11 is pivoted in such a way that the tenons of the collar are positioned opposite the tenons of male flange 24. Tenons 40 of the first crown of collar 11 are positioned opposite tenons 42 of the first crown of male flange 24 and tenons 41 of the second crown of collar 11 are positioned opposite tenons 43 of the second crown of male flange 24. Thus, the tenons of collar 11 abut axially with respect to the tenons of male flange 24.

Each one of the two bayonet assembly systems can ensure, between the tenons of male flange 24 and the tenons of collar 11, a contact over a total angular range that can reach 175°. Preferably, the two assembly systems are angularly offset about the axis of the connector and the connector according to the invention allows the axial stresses to be distributed over about 350° about the axis.

Alternatively, according to the invention, collar 11 and male flange 24 can comprise only one crown which the tenons of the single crown of collar 11 cooperating with the tenons of the single crown of male flange 24.

The number of tenons per crown can vary, notably as a function of the inner tube diameters and of the stresses to be transmitted by the connector.

According to the invention, the bayonet locking system of collar 11 in female flange 23 by the tenons 30 and 31 is similar to the bayonet locking system used for collar 11 in male flange 24 wherein:

tenons 32, 33 of female flange 23 cooperate with tenons 30 and 31 of locking collar 11, female flange 23 and collar 11 respectively comprise two crowns (or rows) of tenons or pegs, allowing axial locking of connector 5 to be ensured, the tenons preferably extend in radial directions, the relations between the radii are also verified so that collar 11 can be inserted in female flange 23, and according to a preferred embodiment, each crown (row) of tenons comprises four tenons.

When collar 11 is engaged around female flange 23, collar 11 follows a translational motion in the direction of the main tube axis according to the following successive stages:

second crown 30 of collar 11 moves on the outside of first crown 33 of female flange 23, then the tenons of second crown 30 of collar 11 fit between tenons 32 of the second crown of female flange 23 and, simultaneously, the tenons of first crown 31 of collar 11 fit between tenons 66 of the first crown of female flange 23, then when collar 11 reaches the stop, tenons 30 of the first crown of collar 11 lodge themselves in a groove (schematized in FIG. 3) provided in female flange. 23 between first crown 32 and second crown 33 of female flange 23, and tenons 31 of the second crown of collar 11 lodge themselves in a groove (schematized in FIG. 3) provided in female flange 23 beneath second crown 33 of female flange 23.

Then, when collar 11 abuts against female flange 23, collar 11 is pivoted in such a way that the tenons of the collar are positioned opposite the tenons of female flange 23. Tenons 30 of the first crown of collar 11 are positioned opposite tenons 32 of the first crown of female flange 23 and tenons 31 of the second crown of collar 11 are positioned opposite tenons 33 of the second crown of female flange 23. Thus, the tenons of collar 11 abut axially with respect to the tenons of female flange 23 and they lock in translation female connector element 8 with respect to male connector element 9.

Pins carrying the weight of collar 11 when the connection is unlocked can be provided in the connection of collar 11 with respect to male connector element 9.

A locking system can be provided to rotationally lock collar 11.

According to the invention, auxiliary line element 7 is tightly secured with an interlocking link (no relative motion between the parts) at a single end of main tube 6 and it is connected by a sliding pivot connection to the other end of the main tube. In the present application, a sliding pivot connection designates a link connecting a first solid to a second solid, and the first solid can translate with respect to the second solid in the direction of an axis and the first solid can pivot with respect to the second solid about this axis. Thus, auxiliary line element 7 can slide and pivot in the axial direction thereof with respect to main tube 6 which auxiliary line element 7 cannot move freely in the radial and tangential directions, that is, in the directions of a plane perpendicular to FIG. 3.

In other words, riser section 4 comprises, at each end thereof, a connection, schematized in FIG. 3, which allows on one hand axially linking an auxiliary line element 7 to main tube 6 and, on the other hand, forming the sliding pivot connection between auxiliary line element 7 and main tube 6.

According to an embodiment of the invention illustrated in FIG. 3, the interlocking link between auxiliary line element 7 and main tube element 6 is achieved at female flange 23, and the sliding pivot connection between auxiliary line element 7 and main tube element 6 is achieved at male flange 24. Alternatively, the interlocking link between auxiliary line element 7 and main tube element 6 is achieved at male flange 24, and the sliding pivot connection between auxiliary line element 7 and main tube element 6 is achieved at female flange 23. While the first variant is described in the rest of the description, the second variant can be constructed based on symmetry to the first variant.

At the end of the section provided with female connector element 8, main tube 6 is extended by female flange 23 comprising a cylindrical passage in which auxiliary line element 7 can slide. Auxiliary line element 7 comprises a stop, for example a nut or a shoulder for axially positioning element 7 with respect to flange 23. When auxiliary line element 7 is mounted on main tube 6, a stop of element 7 rests against female flange 23, for example against the radial shoulder provided in the cylindrical passage to form an interlocking link with no relative motion between the parts.

At the end of the section provided with male connector element 9, main tube 6 is extended by male flange 24 comprising a cylindrical passage in which auxiliary line element 7 can slide and pivot. Auxiliary line element 7 comprises a clearance adjustment mechanism 15 (or adjustable stop) allowing limiting the distance of the relative translational motion between auxiliary line element 7 and male flange 24. Clearance adjustment mechanism 15 forms a stop arranged at an adjustable distance J from male flange 24. Thus, during mounting, a clearance J is adjusted using clearance adjustment mechanism 15. Then, when the riser is under tension, the relative motion or the deformation of auxiliary line element 7 or of main tube element 6 is limited by a distance J, and beyond a certain tension, the clearance becomes zero and auxiliary line element 7 reaches a stop in flange 24.

The female 8 and male 9 connector elements have shapes of revolution about the axis of the main tube element. According to a variant of the invention, flanges 23 and 24 can comprise reinforcements positioned perpendicular to some auxiliary lines (for example, choke line or kill line). According to the invention, connector elements 8 and 9 extend main tube element 6 by increasing the thickness and the outer section of the tube to respectively form flanges 23 and 24. Preferably, the outer section of connector elements 8 and 9 varies progressively along axis 8 preventing a sudden section variation between tube 6 and shoulders 23 and 24 that might weaken the mechanical strength of connector 5. For example, with reference to FIG. 2, flanges 23 and 24 form shoulders.

Auxiliary lines 7 undergo axial compressive stresses caused by the internal/external pressure difference that generates an "end effect" applied onto the tube ends (for example, the auxiliary lines can undergo pressures of the order of 1034 bars, i.e. 15,000 psi). Under such pressures, the main tube elements lengthen and the auxiliary line elements shorten until clearance J is zero. When clearance J becomes zero, all the lines lengthen identically. Main tube elements 6 are likely to lengthen because they have to take up, totally or partly, the weight of the riser and the weight of the drilling mud on the one hand, and the tension stresses imposed on the riser to keep it substantially vertical on the other hand. In general, the main tube elements at the top of the riser, i.e. close to the sea surface, are subjected to maximum tension stresses, hence maximum elongation. Auxiliary line elements 7 are likely to shorten under the effect of the difference between the internal pressure and the external pressure due to the fluid they contain. Indeed, the fluid applies a pressure onto the ends of auxiliary line elements 7 by imposing compressive stresses on auxiliary line elements 7. Furthermore, the radial deformation of the tube due to the internal/external pressure difference causes shortening of the tube. In general, elements 4 at the foot of the riser, i.e. close to the sea bed, undergo the maximum internal/external pressure difference, therefore maximum shortening.

As long as clearance J is positive, the length of auxiliary line element 7 and main tube element 6 positioned at the same height can vary independently of one another. On the other hand, when clearance J becomes zero, i.e. when clearance adjustment means 15 is in contact with male flange 24, auxiliary line element 7 and the corresponding main tube element 6 form a hyperstatic assembly, auxiliary line element 7 is secured to main tube element 6 on the one hand at fastening means and, on the other hand, at the stop that is in contact with flange 24. Therefore, main tube element 6 induces tension stresses in auxiliary line element 7, and vice versa.

Thus, these links allow distribution of the tension stresses applied onto each riser section among main tube 6 and auxiliary line elements 7, while preventing buckling of auxiliary line elements 7. The integration according to the invention via the establishment of clearance J allows increasing the contribution of the main tube and consequently to reduce the axial stresses in the peripheral lines. Reduction of the axial stresses in the peripheral lines by means of this integration is beneficial for the dimensioning of the end pieces and the thickness of the auxiliary lines.

Advantageously, clearance J is selected as a function of the length of the section; indeed, the deformations of the various lines depend on the length thereof. For a conventional riser section of 75 or 90 ft (22.86 m and 27.43 m). Clearance J is set between 0 and 1.5 inch (0 and approximately 38.1 mm). Preferably, clearance J is selected between 0.1 and 1 inch (2.54 and 25.4 mm) for optimal distribution of the stresses in the lines, generation of which decreases the mass of the riser. Alternatively, clearance J is selected between 0.1 and 0.25 inch (2.54 and 6.35 mm). According to one option, clearance J is selected between 0.25 and 1 inch (6.35 and 25.4 mm). A preferred option providing a good compromise is a clearance of approximately 0.5 inch (12.7 mm) or 1 inch (25.4 mm).

According to the invention, clearance adjustment mechanism 15 is a nut or a threaded element. Clearance J is adjusted (prior to connection of the sections) as a function of the stresses and pressures applied on main tube elements 6 and auxiliary line elements 7. The presence of a clearance is beneficial for the dimensioning of the end pieces of the peripheral lines and the thickness of the auxiliary lines.

Figure 5:
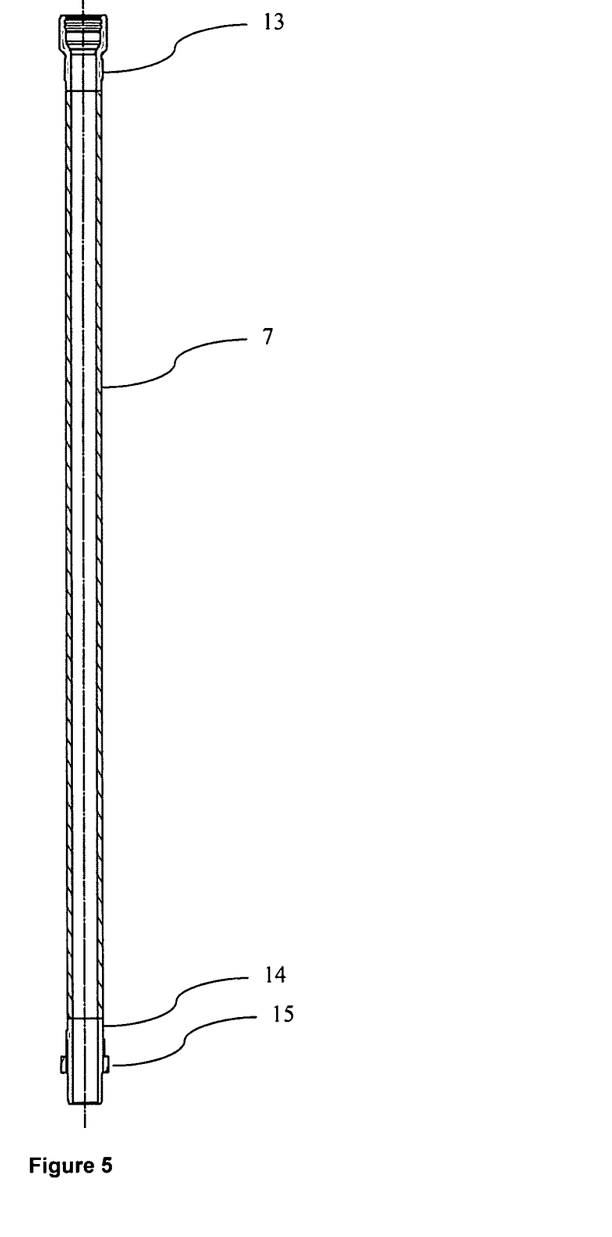
FIGS. 5-7 show three variant embodiments according to the invention of an auxiliary line.
Figure 6:
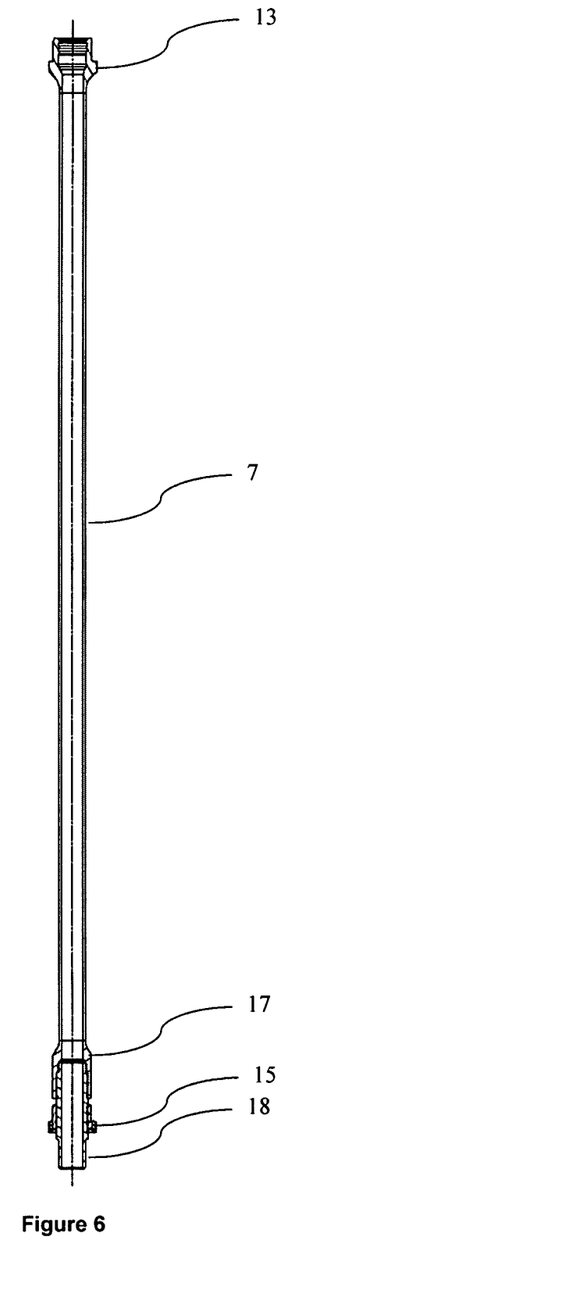
Figure 7:
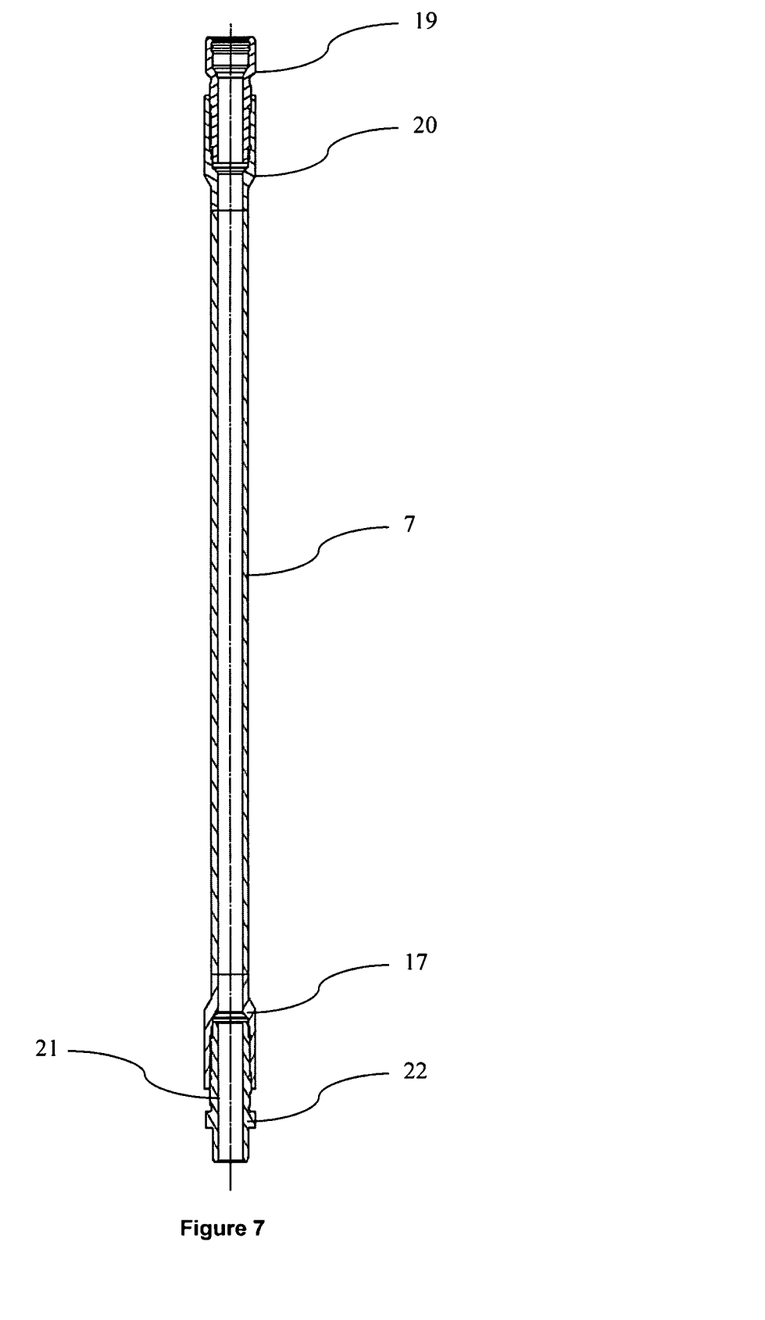

FIGS. 5 to 7 illustrate three variant embodiments of auxiliary line elements 7 equipped with a clearance adjustment mechanism.

According to a first variant of the invention illustrated in FIGS. 2, 3 and 5, auxiliary line elements 7 are connected end to end by connections. A connection is made up of a male end piece 14 arranged at one end of element 7 and of a female end piece 13 arranged at the other end of element 7. A male end piece 14 cooperates tightly with female end piece 13 of another element 7. For example, male end piece 14 of the connection is a tubular part that fits into another tubular part 13. The inner surface of female end piece 13 is adjusted to the outer surface of male end piece 14. Joints are mounted in grooves machined on the inner surface of female end piece 13 to provide a sealed link. The connection allows axial displacement of one of elements 7 with respect to the other, while maintaining the sealed link between the two elements. The male 14 and female 13 end pieces are fastened for example through welding or crimping to a central tube of substantially same length as a main tube element 6 to which auxiliary line element 7 is connected. For this variant of the invention, the clearance adjustment means is a nut 15 positioned on male end piece 14, on a portion that is not intended to be inserted in a female end piece 13.

According to a second variant of the invention illustrated in FIG. 6, auxiliary line elements 7 are connected end to end by means of connections. A connection is a male pin 18 inserted in a receptacle 17 at one end of element 7 and of a female end piece 13 arranged at the other end of element 7. Male pin 18 tightly cooperates with female end piece 13 of another element 7. For example, male pin 18 of the connection is a tubular part that fits into another tubular part 13. The inner surface of female end piece 13 is adjusted to the outer surface of male pin 18. Joints are mounted in grooves machined on the inner surface of female end piece 13 so as to provide a sealed link. The connection allows axial displacement of one of elements 7 with respect to the other, while maintaining the sealed link between the two elements. Female end piece 13 is for example fastened through welding or crimping to a central tube of substantially same length as main tube element 6 to which auxiliary line element 7 is connected. Receptacle 17 is for example fastened through welding or crimping to the central tube. Male pin 18 is fastened to receptacle 17 notably through screwing. Thus, male pin 18 is a wearing part that can be changed upon riser maintenance. For this variant of the invention, the clearance adjustment means is a nut 15 positioned on male pin 18 on a threaded portion that is not intended to be inserted in a female end piece 13.

According to a third variant of the invention illustrated in FIG. 7, auxiliary line elements 7 are connected end to end by means of connections. A connection is a male pin 21 inserted in a receptacle 17 at one end of element 7 and of a female pin 19 inserted in a receptacle 20 arranged at the other end of element 7. Male pin 21 tightly cooperates with female pin 19 of another element 7. For example, male pin 21 of the connection is a tubular part that fits into another tubular part 19 with the inner surface of female pin 19 connected to the outer surface of male pin 21. Joints are mounted in grooves machined on the inner surface of female pin 19 to provide a sealed link. The connection allows axial displacement of one of elements 7 with respect to the other, while maintaining the sealed link between the two elements. Receptacle 20 is for example fastened through welding or crimping to a central tube of substantially same length as main tube element 6 to which auxiliary line element 7 is connected. Female pin 19 is fastened to receptacle 20 notably with screw threads. Receptacle 17 is for example fastened by welding or crimping to the central tube. Male pin 21 is fastened to receptacle 17 notably with screw threads. Thus, the male 21 and female 19 pins are wearing parts that can be changed upon riser maintenance. For this embodiment of the invention, the clearance adjustment means configure a male pin 21 that is threaded in the receptacle and has a shoulder 22 providing the stop.

According to an embodiment of the invention, auxiliary line elements 7 are tubes wound with reinforcement wires such as glass, carbon or aramid fibers, coated with a polymer matrix. Thus, the resistance and the weight of the auxiliary lines are optimized. Indeed, the present invention is particularly well suited for winding auxiliary line elements that afford the advantage of reducing the steel thickness and therefore the weight of the riser. The drawback of winding, involving lower flexural rigidity, is compensated by the clearance that allows buckling of the auxiliary lines to be limited. Alternatively, the main tube and auxiliary line elements can be made of aluminium alloy or titanium alloy.

Having a single locking collar 11 on the outer periphery of flanges 23 and 24 enables compact layout of auxiliary line elements 7 and main tube elements 6. The distance of auxiliary line elements 7 and main tube elements 6 from collar 11 can therefore be limited. Thus, the flexural stresses undergone by flanges 23 and 24 can be minimized.

Furthermore, the connector according to the invention provides an interesting solution for rapidly and simply mounting a riser whose tension stresses are distributed among the auxiliary line elements and the main tube. Indeed, although auxiliary line elements 7 and main tube elements 6 are mounted to jointly withstand the tension stresses applied to the riser, connection of a riser section 4 to another riser section 4 is achieved in one operation by collar 11. This connection allows communication and sealing of the main tube element of a section with of the other section and, simultaneously communicating and sealing the auxiliary line elements of one of the sections with those of the other section.

Consequently, the combination of the locking with a peripheral collar and clearance in the connection of the auxiliary line elements allows the weight of the riser to be optimized.

Application Example

An example of an application according to the invention is shown in order to present the stress distribution and the mass gain in a riser according to the invention.

For this example (according to FIG. 3), the conditions are as follows:
Water depth: 12,500 ft (3810 m)
Maximum mud density: 14.5 ppg (1.74)
Auxiliary lines operating pressure: 15,000 psi (1034 bar)
Maximum working load of the connector: 4,000 kips (1814 t)
Length of the riser sections: 75 ft (22.86 m)
Tapered riser architecture: 7 sections of variable thickness for the main tube.

Table 1 gives the stress distribution in the main tube and in the auxiliary lines: kill line, choke line, booster line, hydraulic line, as a function of clearance J in inches.

TABLE 1

Distribution of the stresses in the riser

| | Clearance J (inches) | | | | | | |
|---|---|---|---|---|---|---|---|
| | 0 | 0.25 | 0.5 | 1 | 1.5 | 2 | 2.5 |
| Main tube | 45% | 50% | 55% | 67% | 82% | 97% | 100% |
| Kill line | 20% | 18% | 16% | 12% | 7% | 1% | 0% |
| Choke line | 20% | 18% | 16% | 12% | 7% | 1% | 0% |
| Booster line | 7% | 6% | 6% | 4% | 1% | 0% | 0% |
| Hydraulic line | 4% | 4% | 3% | 2% | 1% | 0% | 0% |

It can be seen that the distribution varies in the sense of a greater contribution of the main tube when the clearance increases. Between a zero clearance and a 1-inch (25.4 mm) clearance, the stress distribution among the main tube and the peripheral lines goes from 45%-55% to 67%-33% respectively. Above 2 inches (50.8 mm), it is considered that there is no more stress distribution among the various lines with only the main line functioning in the taking up of the stresses, which is not desirable.

Figure 8:
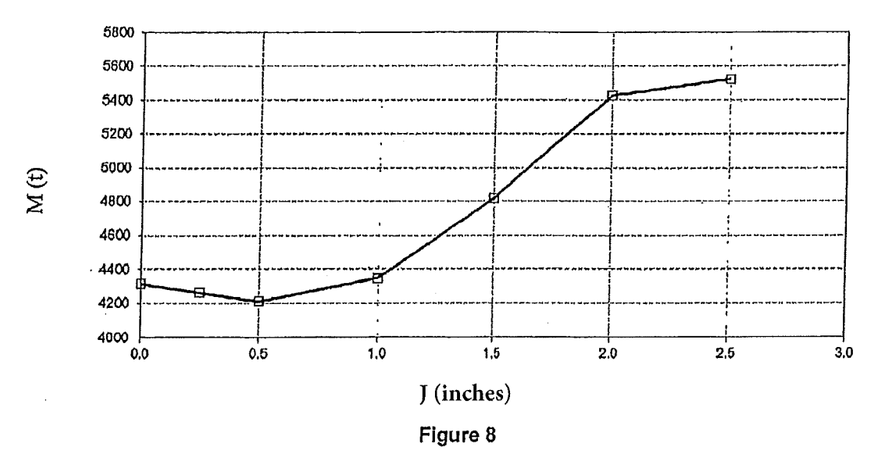
FIG. 8 is a curve showing the mass of the riser as a function of the clearance for an example of the invention.

FIG. 8 shows the mass M in tons of the riser as a function of clearance J in inches for this example. For this curve, the thicknesses of the main tube and of the auxiliary lines have been optimized to meet the aforementioned conditions. It can be observed that the mass is minimal between 0 and 1 inch (25.4 mm) and that a mass optimum is obtained with a clearance of 0.5 inch (12.7 mm). Above 1.25 inch (31.75 mm), the mass of the riser increases significantly, which leads to an increase in the cost of the riser.

Considering the stress distribution and the mass variation as a function of the clearance, the clearance can be set between 0 and 1.25 inch (0 and 31.75 mm) for this example according to the invention. Preferably, the clearance can be set between 0.1 and 1 inch (2.54 mm and 25.4 mm). Optimally, the clearance can be 0.5 inch (12.7 mm).

The invention claimed is:

1. A connector for assembling riser sections, comprising a first main tube element extended by a male connector element provided with a male flange crossed by at least one orifice for passage of a first auxiliary line element, a second main tube element from which extends a female connector element provided with a female flange crossed by at least one orifice for passage of a second auxiliary line element, the male connector element which fits into the female connector element to connect the first and second main tube elements and the first and second auxiliary line elements, the connector comprising means for locking including a locking collar which assembles male and female flanges by cooperation of a periphery of the male and female flanges, and one of auxiliary line elements being secured to one of the male or female flanges and another of the auxiliary line elements being connected by a sliding pivot connection to the male or the female flange, the sliding pivot connection providing relative translational motion between the flange and one of the auxiliary line elements over a distance limited by a means for adjusting a distance of possible translational motion between one of the auxiliary line elements and the flange upon connection of the sections and wherein the distance is displaced by tension on the sections to zero when the riser is offshore during drilling operations between one of the auxiliary line elements and the flange is adjusted to be positive upon connection of the sections and is displaced to zero by tension on the riser when the riser is offshore for drilling operations.

2. A connector as claimed in claim 1, wherein the locking collar comprises first tenons and second tenons on an inner face of the locking collar and the male and female flanges respectively comprise third tenons and fourth tenons on a peripheral surface of the locking collar, the third tenons and the fourth tenons cooperating respectively with the first tenons and the second tenons.

3. A connector as claimed in claim 2, wherein each of the first, second, third and fourth tenons comprises at least two rows of at least four tenons.

4. A connector as claimed in claim 1, wherein the means for adjusting comprises a nut or a threaded part.

5. A connector as claimed in claim 2, wherein the means for adjusting comprises a nut or a threaded part.

6. A connector as claimed in claim 3, wherein the means for adjusting comprises a nut or a threaded part.

7. A connector as claimed in claim 4, wherein a female end piece extends from one of the auxiliary line elements and a male end piece including a nut extending from another of the auxiliary line elements.

8. A connector as claimed in claim 5, wherein a female end piece extends from one of the auxiliary line elements and a male end piece including a nut extending from another of the auxiliary line elements.

9. A connector as claimed in claim 6, wherein a female end piece extends from one of the auxiliary line elements and a male end piece including a nut extending from another of the auxiliary line elements.

10. A connector as claimed in claim 4, wherein a receptacle including a male pin provided with a stop and a receptacle including a male pin provided with a stop extends from another of the auxiliary line element.

11. A connector as claimed in claim 5, wherein a receptacle including a male pin provided with a stop and a receptacle including a male pin provided with a stop extends from another of the auxiliary line element.

12. A connector as claimed in claim 6, wherein a receptacle including a male pin provided with a stop and a receptacle including a male pin provided with a stop extends from another of the auxiliary line element.

13. A connector as claimed in claim 4, wherein a receptacle in which a male threaded pin comprising a shoulder extends from another of the auxiliary line elements.

14. A connector as claimed in claim 5, wherein a receptacle in which a male threaded pin comprising a shoulder extends from of the auxiliary line elements and a receptacle including male pin including a stop extends from another of the auxiliary line elements.

15. A connector as claimed in claim 6, wherein a receptacle in which a male threaded pin comprising a shoulder extends from of the auxiliary line elements and a receptacle including male pin including a stop extends from another of the auxiliary line elements.

16. A connector as claimed in claim 1, wherein a receptacle in which a male threaded pin comprising a shoulder extends from of the auxiliary line elements and a receptacle including male pin including a stop extends from another of the auxiliary line elements.

17. A connector as claimed in claim 1, wherein the male connector element comprises a sleeve inserted in the female connector element.

18. A connector as claimed in claim 2, wherein the male connector element comprises a sleeve inserted in the female connector element.

19. A connector as claimed in claim 3, wherein the male connector element comprises a sleeve inserted in the female connector element.

20. A connector as claimed in claim 4, wherein the male connector element comprises a sleeve inserted in the female connector element.

21. A connector as claimed in claim 7, wherein the male connector element comprises a sleeve inserted in the female connector element.

22. A connector as claimed in claim 11, wherein the male connector element comprises a sleeve inserted in the female connector element.

23. A connector as claimed in claim 14, wherein the male connector element comprises a sleeve inserted in the female connector element.

24. A connector as claimed in claim 17, wherein the male connector element comprises a sleeve inserted in the female connector element.

25. A connector as claimed in claim 1, wherein the auxiliary line elements are a steel tube wrapped with reinforcement wire.

26. A connector as claimed in claim 1, wherein the sliding pivot connection configures a male flange.

27. A connection in accordance with claim 1 comprising at least two riser sections.

* * * * *